US012719589B2

(12) United States Patent
Teofilov et al.

(10) Patent No.: US 12,719,589 B2
(45) Date of Patent: Aug. 25, 2026

(54) SIMULATING DEVICE FOR MULTIPLE PARALLEL ANTENNA SIGNALS, CORRESPONDING SYSTEM AND METHOD

(71) Applicant: Rohde & Schwarz GmbH & Co. KG, Munich (DE)

(72) Inventors: Angel Teofilov, Munich (DE); Rachid El-Assir, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 290 days.

(21) Appl. No.: 18/407,091

(22) Filed: Jan. 8, 2024

(65) Prior Publication Data

US 2024/0333402 A1 Oct. 3, 2024

(30) Foreign Application Priority Data

Mar. 29, 2023 (EP) .................................... 23164870

(51) Int. Cl.
*H04B 17/00* (2015.01)
*H04B 17/391* (2015.01)

(52) U.S. Cl.
CPC ..... *H04B 17/0087* (2013.01); *H04B 17/3912* (2015.01)

(58) Field of Classification Search
CPC ............ H04B 17/0087; H04B 17/3912; G01S 7/4095; G01S 7/4086
See application file for complete search history.

(56) References Cited

U.S. PATENT DOCUMENTS

| | | | |
|---|---|---|---|
| 4,414,643 | A | 11/1983 | Meyer |
| 4,702,698 | A | 10/1987 | Beckwith et al. |
| 4,982,196 | A | 1/1991 | Thomas et al. |
| 5,005,017 | A | 4/1991 | Sikora |
| 5,135,397 | A | 8/1992 | Yen |
| 5,317,689 | A | 5/1994 | Nack et al. |
| 7,627,170 | B2 | 12/2009 | Aboutalib et al. |
| 10,462,262 | B2 | 10/2019 | Parekh et al. |
| 10,571,551 | B2 | 2/2020 | Benneckenstein et al. |
| 11,313,958 | B2 | 4/2022 | Kong |
| 11,486,963 | B2 | 11/2022 | Kong |
| 2017/0322289 | A1* | 11/2017 | Benneckenstein .... G01S 7/4052 |
| 2021/0055384 | A1 | 2/2021 | Lee |
| 2021/0405153 | A1 | 12/2021 | Lee |

(Continued)

OTHER PUBLICATIONS

Extended European Search Report issued in EP 23 164 870.0-1206 by the European Patent Office on Aug. 25, 2023.

(Continued)

*Primary Examiner* — Kyaw Z Soe
(74) *Attorney, Agent, or Firm* — Studebaker Brackett PLLC

(57) ABSTRACT

A simulating device for multiple parallel antenna signals is provided. Said device comprises at least one source signal terminal, an output processing stage for processing in parallel the at least one source signal with multiple parameters, each specific for one antenna of the multiple antennas, thus producing multiple antenna-specific output signals, and a plurality of output terminals, each of which being supplied with one of the multiple antenna-specific output signals, for supplying a plurality of radio frequency signal generators generating a plurality of simulated radio frequency signals.

14 Claims, 7 Drawing Sheets

(56) References Cited

U.S. PATENT DOCUMENTS

2021/0406562 A1 12/2021 Holzinger et al.
2022/0018934 A1 1/2022 Lee et al.
2022/0179044 A1* 6/2022 Vook .................... G01S 7/4069

OTHER PUBLICATIONS

Anonymous; "Pulse Sequencer, Pulse Signal Generation Software"; User Manual, Version 09; Jan. 1, 2018; pp. 1-758; XP055726422.

* cited by examiner

| | PDW Rate single port | Bandwidth | Pulse-on-Pulse (PoP) | RF Port |
|---|---|---|---|---|
| **3 PDW Streams mapped on 1 RF port each** | 6 MPDW/s | 2 GHz | 3 | 2 |
| **6 PDW Streams mapped to single RF port** | 12 MPDW/s | 2 GHz | 6 | 1 |
| **3 PDW Streams mapped to 1 RF port each – RF ports combined** | 6 MPDW/s per 2 GHz band | 4 GHz (Hopping) | 6 (3 per 2 GHz band) | 1 |

Fig. 5

SIMULATING DEVICE FOR MULTIPLE PARALLEL ANTENNA SIGNALS, CORRESPONDING SYSTEM AND METHOD

The invention relates to a simulating device for multiple parallel antenna signals, a system comprising such a device and a plurality of radio frequency signal generators, and a method for simulating multiple antenna signals in parallel.

Generally, in times of an increasing number of application employing radar systems such as advanced driver assistance system or autonomous vehicles, there is a growing need of a simulating device for multiple parallel antenna signals, a system comprising such a device and a plurality of radio frequency signal generators, and a method for simulating multiple antenna signals in parallel for performing measurements with respect to such applications in order to verify their correct functioning.

US 2022/0179044 A1 relates to an apparatus for generating an emulated radar reflection signal of a target moving at a relative velocity. The apparatus includes a radar detector, an emulation transmitter, and a processor. The radar detector is configured to detect radar chirps emitted by a device under test (DUT), where the chirps are emitted at random time intervals. The emulation transmitter is configured to generate emulated radar reflection signals of the target being emulated. The processor is configured to generate control signals at intervals corresponding to the random time intervals at which the radar chirps are emitted by the DUT, where each control signal controls the emulation transmitter to generate a radar reflection signal. A relative phase of the control signals is adjusted according to a duration of each of the random time intervals between successive chirps and a magnitude and sign of the relative velocity of the target. Disadvantageously, especially due to the structure or the configuration, respectively, of said apparatus, a user cannot tailor said apparatus to the desired simulation requirements in a flexible and efficient manner.

Accordingly, there is the object to provide a simulating device for multiple parallel antenna signals, a system comprising such a device and a plurality of radio frequency signal generators, and a method for simulating multiple antenna signals in parallel, thereby allowing for adapting and tailoring the solution offered to the users based on their individual simulation needs in a highly flexible and particularly efficient manner.

This object is solved by the features of the first independent claim for a simulating device for multiple parallel antenna signals, the features of the second independent claim for a system comprising such a device and a plurality of radio frequency signal generators, and the features of the third independent claim for a method for simulating multiple antenna signals in parallel. The dependent claims contain further developments.

According to a first aspect of the invention, a simulating device for multiple parallel antenna signals is provided. Said device comprises at least one source signal terminal, an output processing stage for processing in parallel the at least one source signal with multiple parameters, each specific for one antenna of the multiple antennas, thus producing multiple antenna-specific output signals, and a plurality of output terminals, each of which being supplied with one of the multiple antenna-specific output signals, for supplying a plurality of radio frequency signal generators generating a plurality of simulated radio frequency signals.

Advantageously, simulation can be adapted and/or tailored to desired simulation requirements in a highly flexible and particularly efficient manner.

Further advantageously, the device can allow for a scalable number of radio frequency outputs and/or a scalable pulse rate and/or a scalable pulse-on-pulse density and/or an adaptive hopping bandwidth and/or an intelligent pulse distribution.

According to a first implementation form of the first aspect of the invention, the device further comprises an input processing stage converting the data in the signal received from the at least one source signal terminal and distributing it to the output processing stage. Advantageously, for instance, the corresponding input signal can be translated.

According to a second implementation form of the first aspect of the invention, the output processing stage comprises a plurality of parallel server units, one server unit per radio frequency signal generator or one server unit several radio per frequency signal generators. Advantageously, for example, the server units and/or the input processing stage can abstract the radio frequency signal generators according to their functionality and split the corresponding input signal in such a way that a complex signal and/or scenario can be represented especially at the output or outputs, respectively, of the radio frequency signal generators.

According to a further implementation form of the first aspect of the invention, the simulated radio frequency signals are radar pulses and/or navigation signals. Advantageously, for instance, flexibility can further be increased.

According to a further implementation form of the first aspect of the invention, the parameters include at least one of antenna characteristics and/or antenna location. Advantageously, for example, inefficiencies can further be reduced.

According to a further implementation form of the first aspect of the invention, the at least one source signal terminal is configured to receive specific data from at least one database or databases, exemplarily for radar signals. In this context, the at least one source signal terminal is especially configured to form the at least one source signal on the basis of the specific data. Advantageously, for instance, efficiency can further be increased.

According to a further implementation form of the first aspect of the invention, the at least one source signal terminal comprises information which radio frequency signal generator has which abilities. Advantageously, for example, said information can efficiently be gathered with the aid of the output processing stage especially from the radio frequency signal generators. Further advantageously, said information can be manually configured or requested by the parallel server units of the output processing stage from the radio frequency signal generators.

According to a further implementation form of the first aspect of the invention, the input processing stage is configured to perform at least one port agnostic calculation, especially at least one output terminal agnostic calculation. Advantageously, for instance, not only flexibility but also efficiency can further be increased.

According to a further implementation form of the first aspect of the invention, the at least one port agnostic calculation, especially the at least one output terminal agnostic calculation, comprises at least one of receiver properties, receiver movement, receiver velocity, doppler shift, signal attenuation, or any combination thereof. Advantageously, for example, inefficiencies can further be reduced. Further advantageously, it is also possible that an input signal to the source signal terminal or an input server, respectively, has the foregoing information already incorporated. In this case, the source signal terminal or the input server, respectively, does not need to do those particular calculations again but it can do it especially in the case that the input signal does not account for them.

According to a second aspect of the invention, a multiple antenna signal generation system is provided. Said system comprises a simulation device according to the first aspect of the invention or any implementation form thereof, respectively, and a plurality of radio frequency signal generators connected to the output terminals of the simulating device, each radio frequency signal generator generating one or more output signals simulating antenna signals.

Advantageously, simulation can be adapted and/or tailored to desired simulation requirements in a highly flexible and particularly efficient manner.

Further advantageously, the system can allow for a scalable number of radio frequency outputs and/or a scalable pulse rate and/or a scalable pulse-on-pulse density and/or an adaptive hopping bandwidth and/or an intelligent pulse distribution.

As a further advantage, the frequency range can also be flexible. For example, one radio frequency signal generator may simulate from 18 GHz to 20 GHz and another one from 28 GHz to 30 GHz. The source signal terminal or an input server, respectively, can intelligently assign the respective pulses to the corresponding output especially based on the corresponding simulation scenario.

According to a first implementation form of the second aspect of the invention, an input stage, especially the input processing stage, of the simulating device distributes the converted data to the parallel server units of the output processing stage in a manner, exemplarily as to the bandwidth, taking into account characteristics of the radio frequency signal generator supplied by the respective server unit and/or the plurality of output terminals. Advantageously, for instance, said characteristics can efficiently be gathered with the aid of the output processing stage or the server units, respectively, especially from the respective radio frequency signal generator. Further advantageously, said characteristics can be manually configured or requested by the server units of the output processing stage from the radio frequency signal generators.

According to a second implementation form of the second aspect of the invention, the one or more output signals represent a respective realistic antenna output and/or input signal. Advantageously, for example, efficiency can further be increased.

According to a further implementation form of the second aspect of the invention, each radio frequency signal generator is configured to simulate a hopping range up to a certain bandwidth. Advantageously, for instance, a further radio frequency signal generator can be added via a combiner if a wider hopping bandwidth is desired, thereby increasing both flexibility and efficiency.

According to a further implementation form of the second aspect of the invention, each radio frequency signal generator is configured with an interface to accommodate several base band units, especially several base band boards. Advantageously, for example, such a based band unit or base band board, respectively, can be configured to be coupled, especially detachably coupled, to the respective radio frequency signal generator or the corresponding interface thereof, respectively, to which leads an increased flexibility and efficiency.

According to a third aspect of the invention, a method for simulating multiple antenna signals in parallel is provided. Said method comprises the steps of providing at least one source signal, converting the source signal, processing in parallel the at least one converted source signal with multiple parameters, each specific for one antenna of the multiple antennas, thus producing multiple antenna-specific output signals, and supplying the multiple antenna-specific output signals to a plurality of radio frequency signal generators generating a plurality of simulated radio frequency signals.

Advantageously, simulation can be adapted and/or tailored to desired simulation requirements in a highly flexible and particularly efficient manner.

Further advantageously, the method can allow for a scalable number of radio frequency outputs and/or a scalable pulse rate and/or a scalable pulse-on-pulse density and/or an adaptive hopping bandwidth and/or an intelligent pulse distribution.

Exemplary embodiments of the invention are now further explained with respect to the drawings by way of example only, and not for limitation. In the drawings:

FIG. 5 shows several mapping options in the context of Pulse Descriptor Words (PDW) streaming in the sense of the invention;

Figure 1:
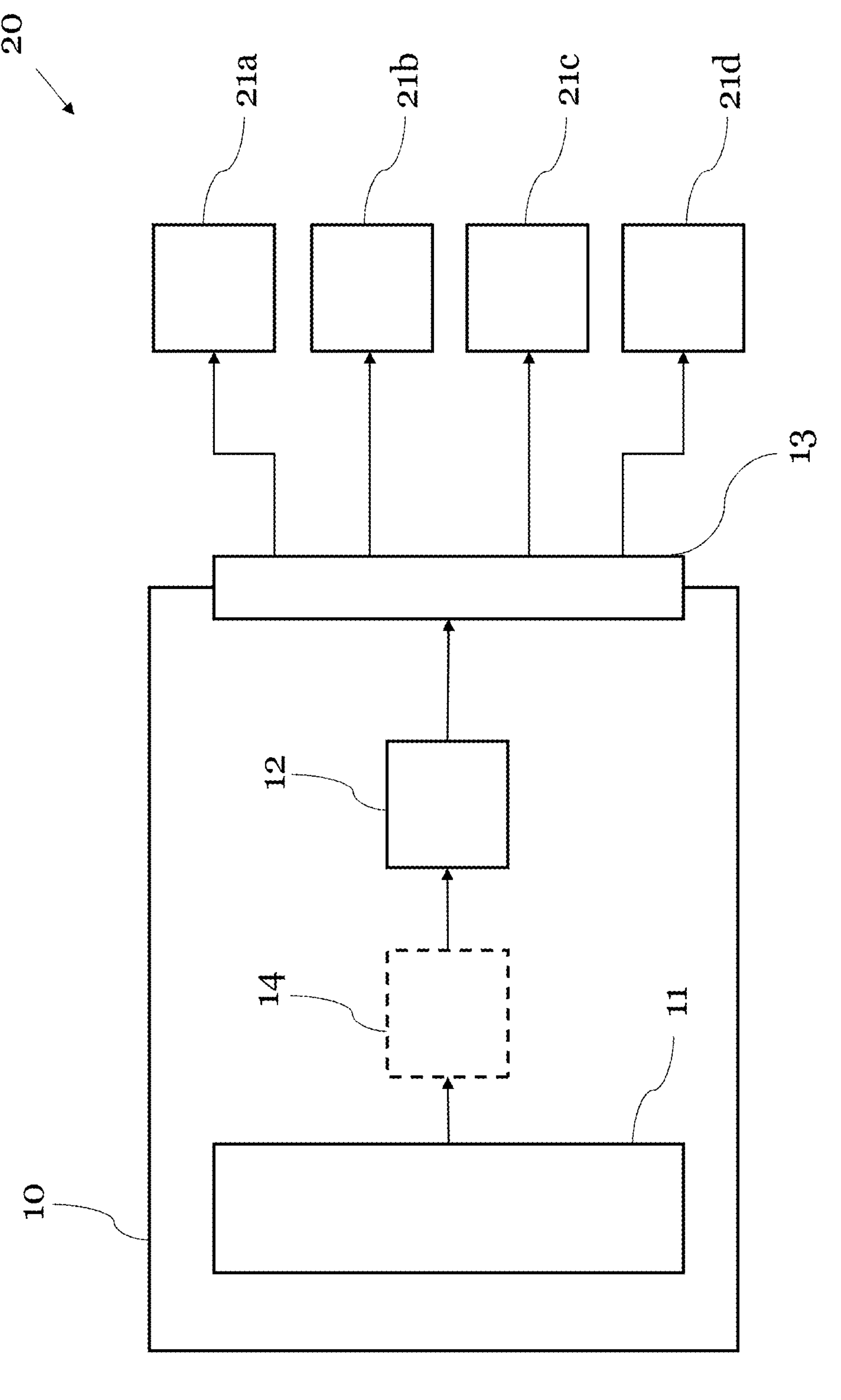
FIG. 1 shows an exemplary embodiment of a simulating device according to the first aspect of the invention in combination with an exemplary embodiment of a system according to the second aspect of the invention.

With respect to FIG. 1, a block diagram of an exemplary embodiment 10 of a simulating device for multiple parallel antenna signals according to the first aspect of the invention in combination with an exemplary embodiment 20 of a system according to the second aspect of the invention is illustrated.

The simulating device 10 comprises at least one source signal terminal, exemplarily the source signal terminal 11, an output processing stage 12 for processing in parallel the at least one source signal with multiple parameters, each specific for one antenna of the multiple antennas, thus producing multiple antenna-specific output signals, and a plurality of output terminals 13, each of which being supplied with one of the multiple antenna-specific output signals, for supplying a plurality of radio frequency signal generators, exemplarily the four radio frequency signal generators 21*a*, 21*b*, 21*c*, 21*d*, generating a plurality of simulated radio frequency signals.

As it can further be seen from FIG. 1, it might be advantageous if the device 10 further comprises an input processing stage 14 converting the data in the signal received from the at least one source signal terminal 11 and distributing it to the output processing stage 12.

It is noted that it might be advantageous if the output processing stage 12 comprises a plurality of parallel server units, one server unit per radio frequency signal generator or one server unit per several radio frequency signal generators.

It is further noted that the simulated radio frequency signals may preferably be radar pulses and/or navigation signals.

Furthermore, it might be advantageous if the above-mentioned parameters include at least one of antenna characteristics and/or antenna location.

With respect to the source signal terminal 11, it is noted that it might be advantageous if source signal terminal 11 is configured to receive specific data from at least one database or databases, exemplarily for radar signals. In this context, the source signal terminal 11 is especially configured to form the at least one source signal on the basis of the specific data.

It is noted that it might be advantageous if the source signal terminal 11 comprises information which radio frequency signal generator has which abilities.

With respect to the input processing stage 14, it is noted that it might be advantageous if the input processing stage 14 is configured to perform at least one port agnostic calculation, especially at least one output terminal agnostic calculation.

In this context, the at least one port agnostic calculation, especially the at least one output terminal agnostic calculation, may preferably comprise at least one of receiver properties, receiver movement, receiver velocity, doppler shift, signal attenuation, or any combination thereof.

It is noted that it is also possible that an input signal to the source signal terminal 11 or the input processing stage 14, respectively, has the foregoing information already incorporated. In this case, the source signal terminal 11 or the input processing stage 14, respectively, does not need to do those particular calculations again but it can do it especially in the case that the input signal does not account for them.

As already mentioned above, FIG. 1 also depicts an exemplary embodiment 20 of the multiple antenna signal generation system. Said system 20 comprises the simulation device 10 and a plurality of radio frequency signal generators, exemplarily the four radio frequency signal generators 21*a*, 21*b*, 21*c*, 21*d*, connected to the output terminals 13 of the simulating device 10, each radio frequency signal generator 21*a*, 21*b*, 21*c*, 21*d* generating one or more output signals simulating antenna signals.

Especially for the above-mentioned advantageous case that the output processing stage 12 comprises a plurality of parallel server units, one server unit per radio frequency signal generator or one server unit per several radio frequency signal generators, it is noted that it might be advantageous if an input stage, exemplarily the input processing stage 14, of the simulating device 10 distributes the converted data to the parallel server units of the output stage 12 in a manner, exemplarily as to the bandwidth, taking into account characteristics of the radio frequency signal generator supplied by the respective server unit and/or the plurality of output terminals 13.

It is further noted that it might be advantageous if the one or more output signals represent a respective realistic antenna output and/or input signal.

Moreover, with respect to the radio frequency signal generators 21*a*, 21*b*, 21*c*, 21*d*, it might be advantageous if each radio frequency signal generator is configured to simulate a hopping range up to a certain bandwidth.

In addition to this or as an alternative, each radio frequency signal generator may preferably be configured with an interface to accommodate several base band units, especially several base band boards.

For the sake of completeness, with respect to the corresponding interconnections between the elements or parts, respectively, of FIG. 1, it is noted that the source signal terminal 11 is connected to the output processing stage 12 especially via the input processing stage 14 if present. Furthermore, the output processing stage 12 is exemplarily connected to the plurality of output terminals 13. Moreover, said plurality of output terminals 13 is exemplarily connected to the plurality of radio frequency signal generators 21*a*, 21*b*, 21*c*, 21*d*.

Figure 2:
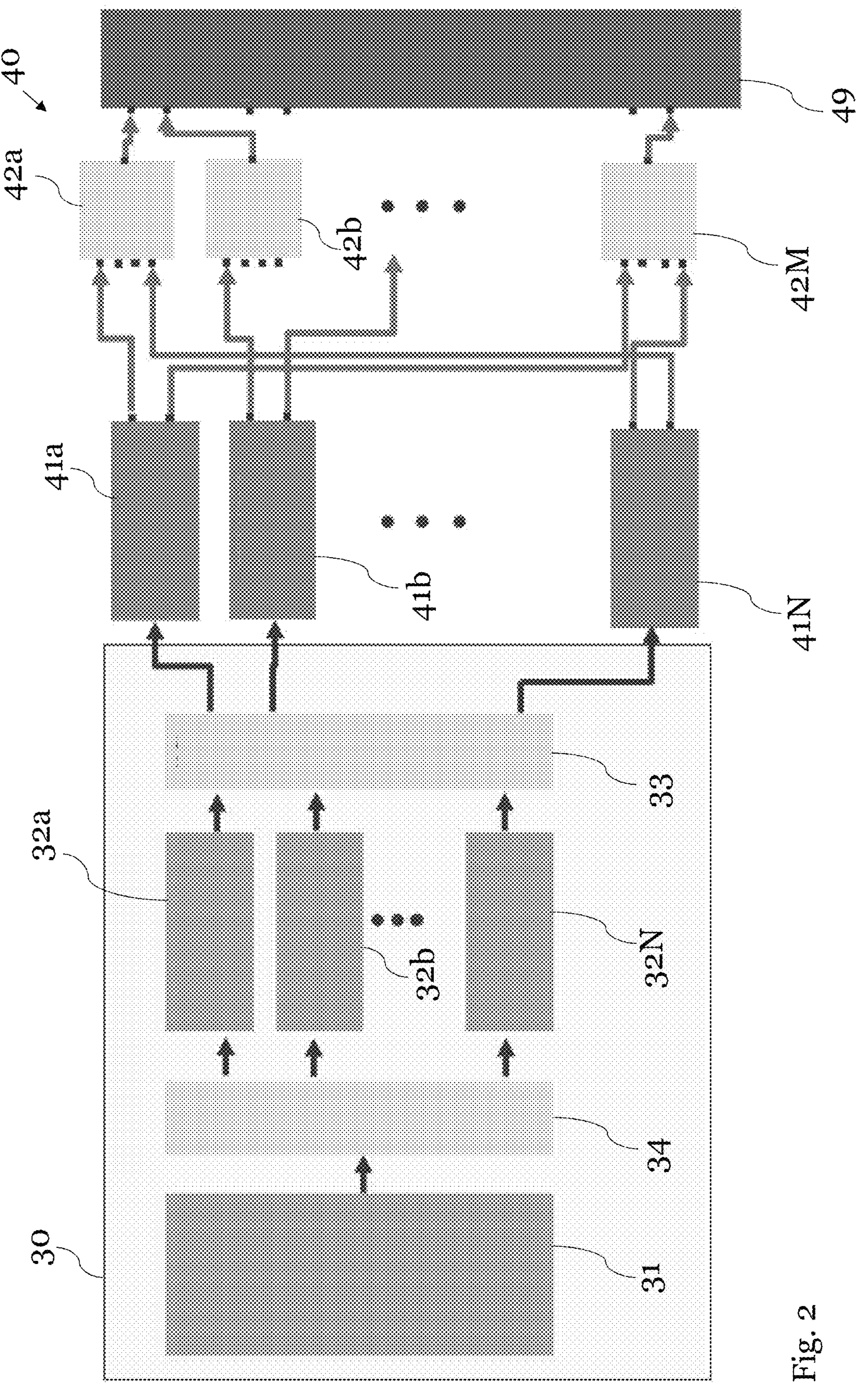
FIG. 2 shows a further exemplary embodiment of the inventive simulating device in combination with a further exemplary embodiment of the inventive system.

Now, with respect to FIG. 2, a further exemplary embodiment 30 of the inventive simulating device in combination with a further exemplary embodiment of the inventive system 40 is depicted.

Exemplarily, the device 30 comprises an input server unit 31. With respect to said input server unit 31, it is noted that the explanations regarding the source signal terminal 11 above can additionally or alternatively apply for said input server unit 31, and vice versa. This can analogously apply for element 71 of FIG. 6, and vice versa. Furthermore, the source signal terminal 11 may especially comprise or be the input server unit 31 or element 71, respectively.

Said input server unit 31 is exemplarily configured for receiving input data and/or transforming and/or converting and/or reformatting data, especially said input data, into a new output format.

Especially in the context of converting said data, it might be advantageous if the corresponding data is converted from a custom and/or proprietary to any output format, or from any input format to any output format.

Accordingly, the system 40 can especially be seen as a signal generation system with input signal translation.

It is noted that it might be advantageous if the input server unit 31 is configured for modifying the input data or an input signal according to corresponding simulation parameters. For example, said simulation parameters can comprise distance of the simulated radar receiver and/or corresponding position.

As it can further be seen from FIG. 2, the device 30 comprises an input processing stage 34 exemplarily connected to the input server unit 31. With respect to said input processing stage 34, it is noted that the explanations regarding the input processing stage 14 above can additionally or alternatively apply for said input processing stage 34, and vice versa. Furthermore, the input server unit 31 can especially comprise said input processing stage 34.

Said input processing stage 34 or said input server unit 31, respectively, can especially be configured to arbitrate and/or schedule and/or route the respective signals according to the functionality and/or port mapping of the corresponding ones of the radio frequency signal generators, exemplarily the N radio frequency signal generators 41*a*, 41*b*, . . . , 41N.

With respect to said radio frequency signal generators 41*a*, 41*b*, . . . , 41N, it is noted that the explanations regarding the radio frequency signal generators 21*a*, 21*b*, 21*c*, 21*d* above can additionally or alternatively apply for said radio frequency signal generators 41*a*, 41*b*, . . . , 41N, and vice versa. This can analogously apply for element 61 of FIG. 3, elements 61*a*, 61*b*, 61*c*, 61*d* of FIG. 4, and/or element 81 of FIG. 6, and vice versa.

Moreover, the input processing stage 34 is exemplarily connected to a plurality of parallel server units, especially N output server units 32*a*, 32*b*, . . . , 32N. With respect to said output server units 32*a*, 32*b*, . . . , 32N, it is noted that the explanations regarding the parallel server units above in the context of FIG. 1 can additionally or alternatively apply for said output server units 32*a*, 32*b*, . . . , 32N, and vice versa. This can analogously apply for elements 72*a*, 72*b*, . . . , 72N of FIG. 6, and vice versa.

In addition or as an alternative to the input processing stage 34 or the input server unit 31, respectively, said output server units 32*a*, 32*b*, . . . , 32N can especially be configured to arbitrate and/or schedule and/or route the respective signals according to the functionality and/or port mapping of the corresponding ones of the radio frequency signal generators, exemplarily the N radio frequency signal generators 41*a*, 41*b*, . . . , 41N.

In this context, it might be advantageous if the input processing stage 34 or the input server unit 31, respectively, and the output server units 32*a*, 32*b*, . . . , 32N are together configured to arbitrate and/or schedule and/or route the respective signals according to the functionality and/or port mapping of the corresponding ones of the radio frequency signal generators, exemplarily the N radio frequency signal generators 41*a*, 41*b*, . . . , 41N.

With respect to the output server units 32*a*, 32*b*, . . . , 32N, it is noted that each output server may especially be paired to one radio frequency signal generator of the radio frequency signal generators 41*a*, 41*b*, . . . , 41N so that the system 40 can be scaled appropriately depending on the use case.

Accordingly, the system 40 can especially be seen as a signal generation system with a scalable number of radio frequency outputs. Especially in the light of the above-mentioned input signal translation, the system 40 may be seen as a signal generation system with input signal translation and a scalable number of radio frequency outputs.

It is further noted that it is also possible that each output server is connected to at least one signal generator.

Moreover, it might be advantageous if there is an assignment of the respective pulses or PDW, respectively, to the corresponding output servers especially based on the attached or connected radio frequency signal generators.

As it can further be seen from FIG. 2, the device 30 comprises plurality of output terminals 33. With respect to said plurality of output terminals 33, it is noted that the explanations regarding the plurality of output terminals 13 can additionally or alternatively apply for said plurality of output terminals 33, and vice versa. Furthermore, the output server units 32*a*, 32*b*, . . . , 32N can especially comprise the plurality of output terminals 33.

With respect to the radio frequency signal generators 41*a*, 41*b*, . . . , 41N, it is noted that the corresponding connections may preferably be established via a stream, especially via a Pulse Descriptor Words (PDW) stream.

Accordingly, the corresponding communication of the input processing stage 34 and/or the plurality of output terminals 33 may preferably be based on a stream, especially a PDW stream. Additionally or alternatively, said communication may be based on Ethernet, especially 10 Gbit Ethernet.

With respect to the radio frequency signal generators 41*a*, 41*b*, . . . , 41N, it is noted that it might be advantageous if each radio frequency signal generator is configured to simulate at least one antenna signal. Preferably, each radio frequency signal generator comprises two or more outputs, exemplarily four outputs, with antennas.

Furthermore, each radio frequency signal generator can be configured with an interface to accommodate several base band units or base band boards, respectively. This advantageously enables a higher streaming bit rate or streaming PDW rate.

Moreover, each radio frequency signal generator can be configured to simulate a hopping range up to an certain bandwidth, exemplarily up to 2 GHz or more, especially up to 4 GHZ.

It is noted that it might be advantageous if each radio frequency signal generator is configured to receive at least one data stream for generating at least one radio frequency output signal.

Said radio frequency output signal may preferably represent a realistic antenna output signal, especially transmitter signal, and/or realistic antenna input signal, especially receiver signal. For instance, said radio frequency output signal can be an overlayed signal.

Again, with respect to the input server unit 31, it is noted that the input server unit 31 may further be configured to receive specific data from at least one database or databases, exemplarily for radar signals.

It might be advantageous if the input server unit 31 has the information which signal generator has which abilities. Advantageously, the input server unit 31 may preferably perform channel assignment based on the frequency and/or power bands of the ports within the radio frequency signal generators 41*a*, 41*b*, . . . , 41N.

Additionally or alternatively, the input server unit 31 may be configured to perform any port agnostic calculations, exemplarily at least one of receiver properties, receiver movement, receiver velocity, doppler shift, signal attenuation, or any combination thereof.

In further addition to this or as a further alternative, the input server unit 31 may be configured to distribute data, especially a PDW, to the respective radio frequency signal generator with the correct predefined frequency range. For example, one of the radio frequency signal generators 41*a*, 41*b*, . . . , 41N, especially the first radio frequency signal generator 41*a*, may comprise a frequency range of 18 GHz to 20 GHZ, whereas another one of the radio frequency signal generators 41*a*, 41*b*, . . . , 41N, especially the second radio frequency signal generator 41*b*, may comprise a frequency range of 20 GHZ to 22 GHZ.

With respect to the output server units 32*a*, 32*b*, . . . , 32N, it is noted that it might be advantageous if at least one, preferably each, of said output server units 32*a*, 32*b*, . . . , 32N is configured to consider the position of the corresponding antenna as well as the corresponding antenna pattern.

As it can further be seen from FIG. 2, the system 40 exemplarily comprises a device under test or a system under test 49, respectively. In this context, the system 40 is configured to generate radar signals of interest especially with respect to said device under test or said system under test 49, respectively.

It is noted that it might be advantageous if the system 40 comprises M combiners 42*a*, 42*b*, . . . , 42M, wherein the number of combiners is preferably equal to the number of ports of the device under test or the system under test 49, respectively. Accordingly, the system 40 may comprise a plurality of combiners, one for each port of the device under test or the system under test 49, respectively. For instance, the device under test or the system under test 49, respectively, may comprise 8 ports, whereas the system 40 may comprise 8 combiners, one for each of said 8 ports.

Advantageously, another radio frequency generator can be added via such a combiner if a wider hopping bandwidth is necessary or desired, respectively.

Further advantageously, the scheduling which respective radio frequency pulse is simulated on which corresponding radio frequency port can especially be done by the input server unit 31 and/or at least one, preferably each, of the output server units 32*a*, 32*b*, . . . , 32N.

It is further noted that it might be advantageous if the device 30 is configured to perform transformation and/or scheduling and/or arbitration of input PDWs into a desired PDW format which is interpretable by the radio frequency signal generators 41*a*, 41*b*, . . . , 41N.

Figure 3:
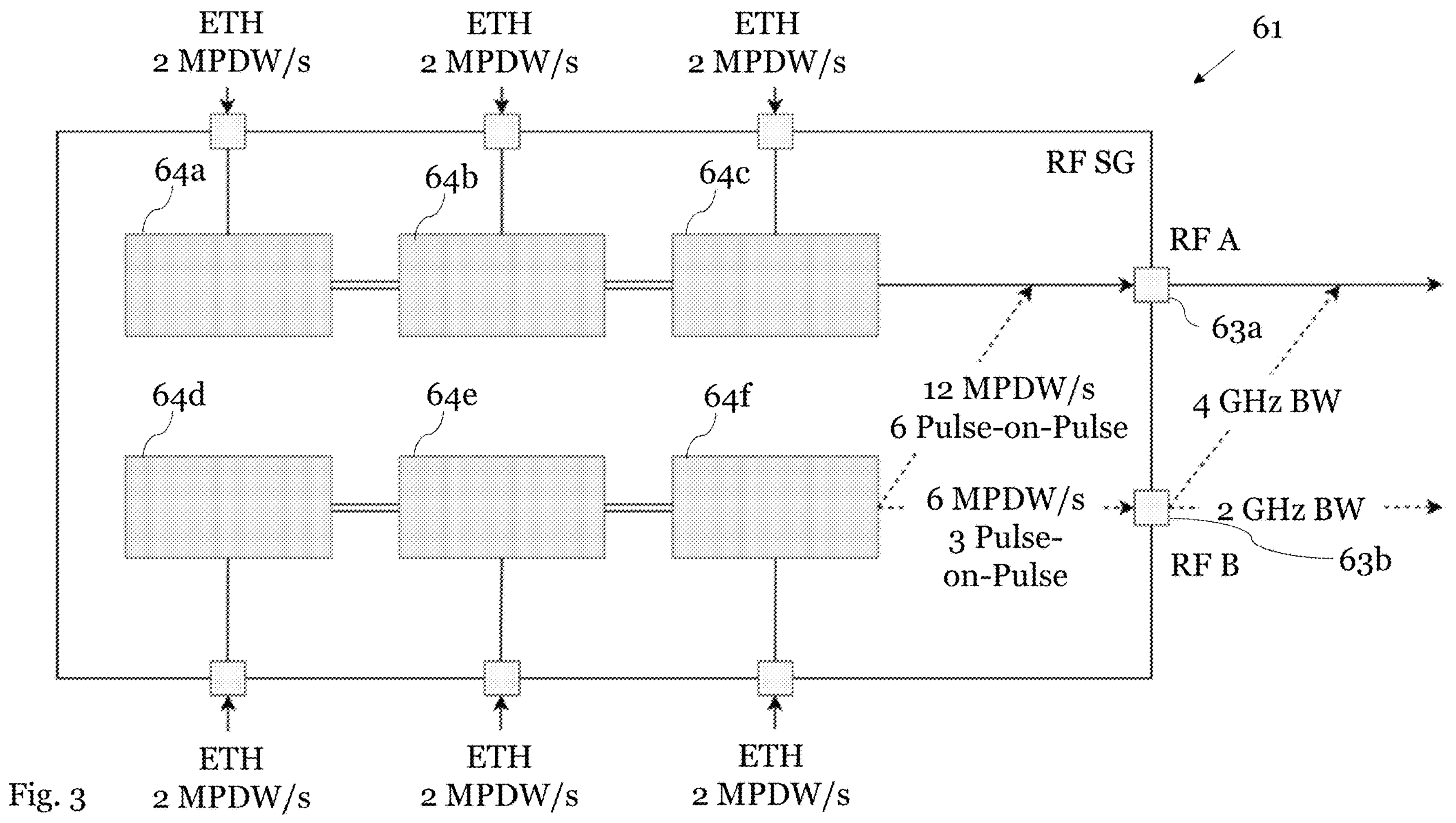
FIG. 3 shows an exemplary embodiment of a radio frequency signal generator in the context of the invention.

Now, with respect to FIG. 3, an exemplary embodiment 61 of a radio frequency signal generator, such as the signal generators 21*a*, 21*b*, 21*c*, 21*d*, 41*a*, 41*b*, . . . , 41N, 61*a*, 61*b*, 61*c*, 61*d*, 81, is depicted.

As already mentioned above, several base band units or base band boards, respectively, can be used for the radio frequency signal generator 61. Exemplarily, the radio frequency signal generator comprises six base band units 64*a*, 64*b*, 64*c*, 64*d*, 64*e*, 64*f*. Further exemplarily, each of said base band units 64*a*, 64*b*, 64*c*, 64*d*, 64*e*, 64*f* is embodied as a base band boards. Each of said base band boards 64*a*, 64*b*, 64*c*, 64*d*, 64*e*, 64*f* is configured to be coupled, especially detachably coupled, to the radio frequency signal generator 61 or a corresponding interface thereof, respectively.

As it can further be seen from FIG. 3, the radio frequency signal generator 61 comprises two ports, especially two radio frequency outputs 63*a*, 63*b*.

With respect to the base band boards 64*a*, 64*b*, 64*c*, 64*d*, 64*e*, 64*f*, it is noted that each of said base band boards 64*a*, 64*b*, 64*c*, 64*d*, 64*e*, 64*f* is exemplarily capable of 2 MPDW/s, wherein the corresponding PDWs may especially be transmitted via a communication based on Ethernet. Accordingly, for instance, adding a second baseband board enables the simulation of an aggregate rate of 4 MPDW/s.

As exemplarily shown according to FIG. 3, 6 baseband boards have been accommodated for a total rate of 12 MPDW/s per radio frequency output.

Accordingly, especially in the context of the radio frequency signal generators 21*a*, 21*b*, 21*c*, 21*d*, 41*a*, 41*b*, . . . , 41N, 61*a*, 61*b*, 61*c*, 61*d*, 81, each radio frequency signal generator could simulate one radio frequency output, especially having 12 MPDW/s, to two radio frequency outputs, each especially with 6 MPDW/s.

Advantageously, for instance, adding another radio frequency signal generator could be used to double the number of radio frequency outputs especially with the same PDW rate.

As an alternative, especially in the context of the above-mentioned combiners 42*a*, 42*b*, . . . , 42M, adding a radio frequency signal generator and combining the radio frequency outputs to a single radio frequency output can be used to double the effective PDW rate per radio frequency output.

Yet another option is to add a radio frequency signal generator, combine the radio frequency outputs and stream PDW data to either first or second radio frequency signal generator, effectively resulting in doubling the maximum hopping bandwidth while not changing the effective PDW rate.

Especially in the light of the foregoing three alternatives, for example, the advantage can be achieved that the corresponding system is scalable in different ways. It is noted that for the sake of better comprehensibility, the corresponding several mapping options in the context of PDW streaming are summarized in FIG. 5 on the basis of corresponding numerical examples.

With respect to the scalability of the system in accordance with the invention, it is noted that the system, such as the system 20, 40, 60, 80, can especially be seen as a system with scalable number of radio frequency outputs and/or scalable pulse rate or pulse-on-pulse density and/or adaptive hopping bandwidth and/or intelligent pulse distribution.

Figure 4:
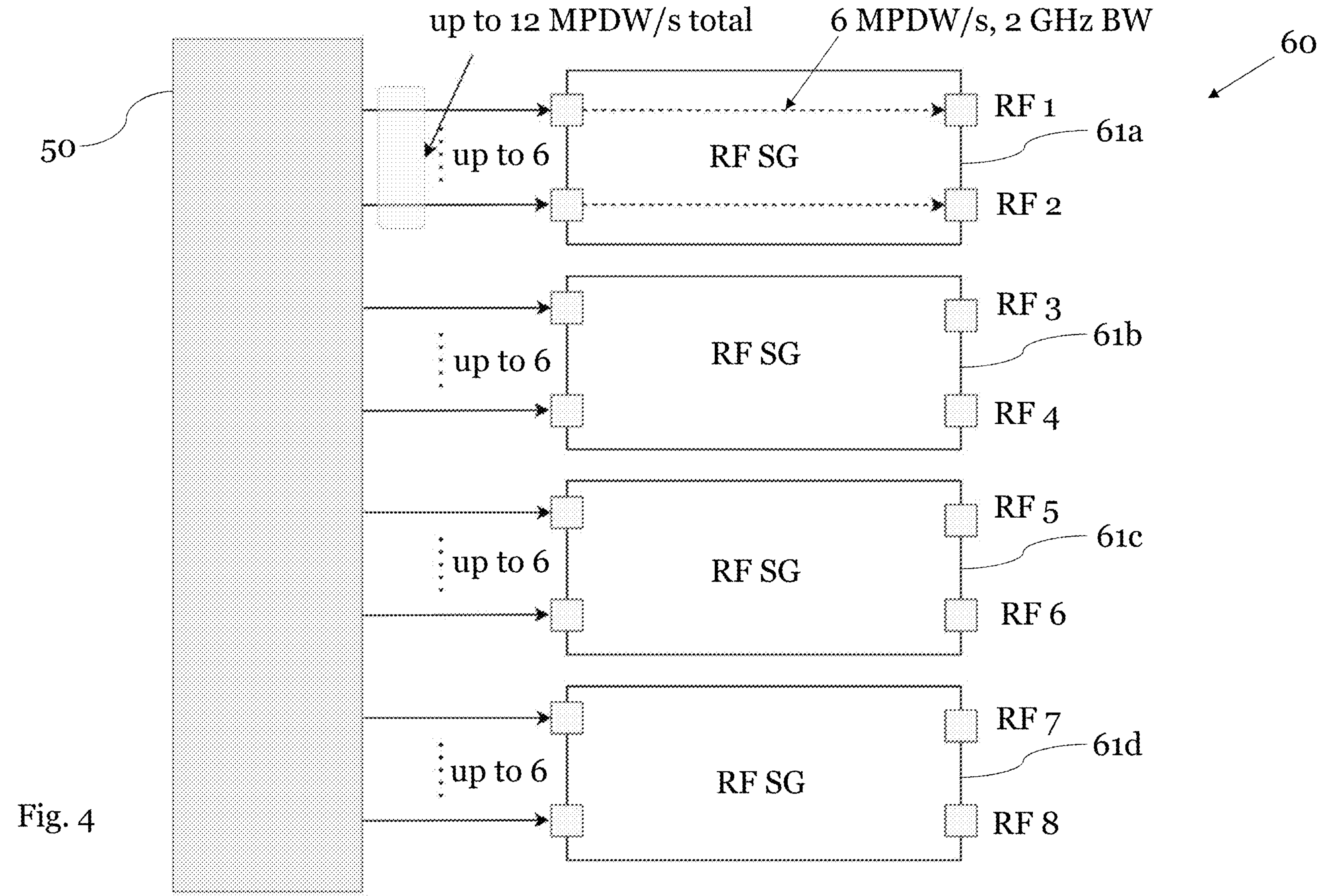
FIG. 4 shows a further exemplary embodiment of the inventive simulating device in combination with a further exemplary embodiment of the inventive system.

Especially following the numerical example regarding PDW stream mapping according to FIG. 5, FIG. 4 shows a further exemplary embodiment 50 of the inventive simulating device in combination with a further exemplary embodiment 60 of the inventive system.

According to said FIG. 4, the device 50 is exemplarily connected to four radio frequency signal generators 61*a*, 61*b*, 61*c*, 61*d*, each of which especially comprises two port, preferably radio frequency outputs.

Furthermore, each connection between the device 50 and the radio frequency signal generators 61*a*, 61*b*, 61*c*, 61*d* can comprise up to six PDW streams. Accordingly, each connection between the device 50 and the radio frequency signal generators 61*a*, 61*b*, 61*c*, 61*d* can have up to 12 MPDW/s in total.

Moreover, as it can further be seen from FIG. 4, three PDW streams, 2 MPDW/s per stream, are exemplarily mapped to a first port or radio frequency output, respectively, of the first radio frequency signal generator 61*a* especially with a 2 GHz bandwidth.

Figure 6:
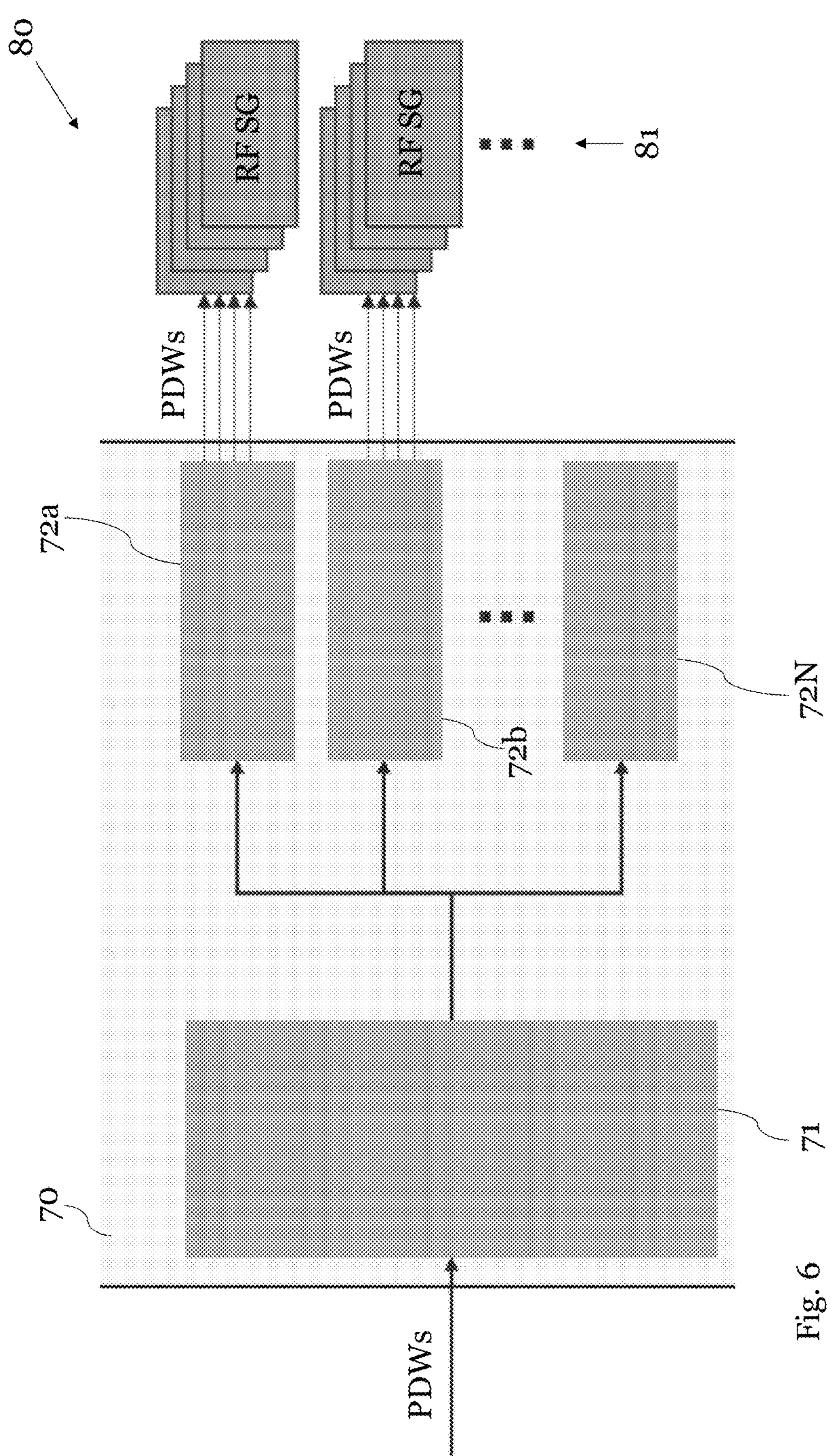
FIG. 6 shows a further exemplary embodiment of the inventive simulating device in combination with a further exemplary embodiment of the inventive system.

Now, with respect to FIG. 6, a further exemplary embodiment 70 of the inventive simulating device in combination with a further exemplary embodiment 80 of the inventive system is illustrated.

Said device 70 comprises a source signal terminal or an input server unit 71, respectively, exemplarily for receiving at least one PDW stream and N output server units 72*a*, 72*b*, . . . , 72N exemplarily connected to the source signal terminal or the input server unit 71, respectively.

Furthermore, at least a part, exemplarily two, preferably each, of the output server units 72*a*, 72*b*, . . . , 72N is exemplarily configured for providing at least one PDW stream to a plurality 81 of radio frequency signal generators. In particular, it is noted that it might be advantageous if there is one output server unit per four radio frequency signal generators. Exemplarily, each of the first and the second output server units 72*a*, 72*b* are connected to four radio frequency signal generators of the plurality 81 of radio frequency signal generators. Further exemplarily, each of said radio frequency signal generators receives a corresponding PDW stream.

It is noted that it might be advantageous if one output server unit is responsible for one radio frequency output and thus streams only to the corresponding radio frequency signal generator.

It is further noted that it might be advantageous if especially for the case that multiple radio frequency signal generators form a single radio frequency output, then an output server unit can stream to multiple radio frequency signal generators. For the exemplary case that a user requires 24 MPDW/s, then two radio frequency signal generators with six baseband boards each can be taken, and a combiner can be used to combine the corresponding signals.

Figure 7:
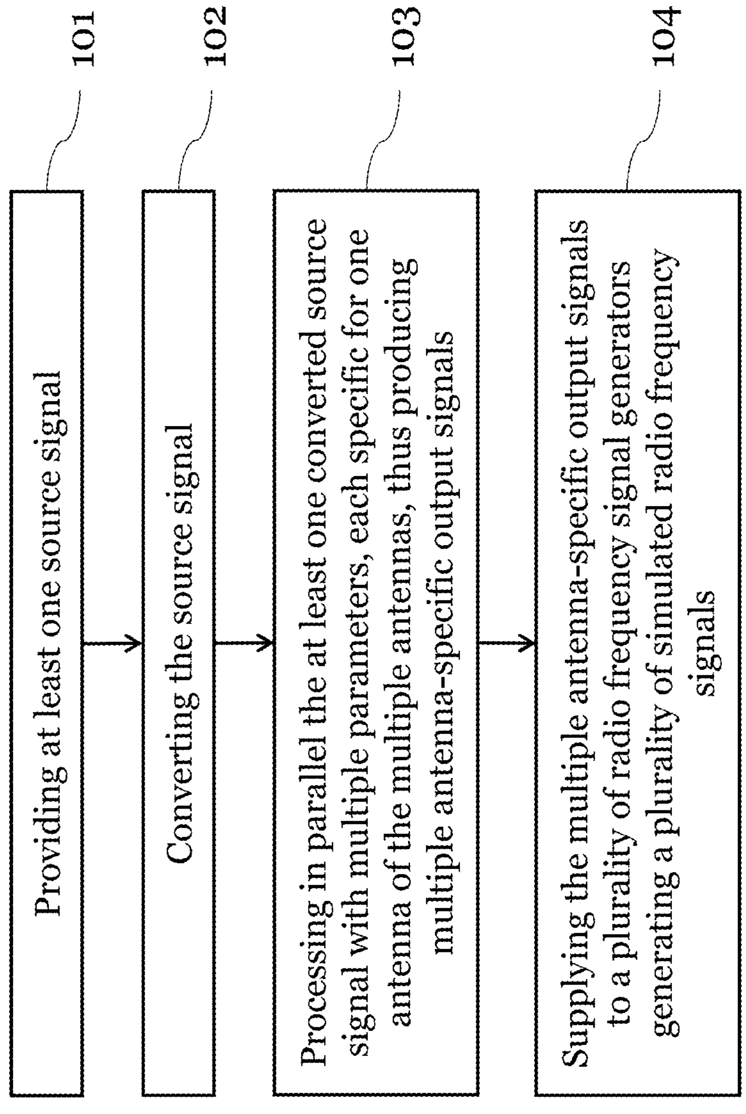
FIG. 7 shows a flow chart of an exemplary embodiment of the third aspect of the invention.

Finally, FIG. 7 shows a flow chart of an exemplary embodiment of the inventive method for simulating multiple antenna signals in parallel. A first step 101 comprises providing at least one source signal. A second step 102 comprises converting the source signal. Furthermore, a third step 103 comprises processing in parallel the at least one converted source signal with multiple parameters, each specific for one antenna of the multiple antennas, thus producing multiple antenna-specific output signals. In addition to this, a fourth step comprises supplying the multiple antenna-specific output signals to a plurality of radio frequency signal generators generating a plurality of simulated radio frequency signals.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The invention claimed is:

1. Simulating device for multiple parallel antenna signals, the device comprising:

at least one source signal terminal providing at least one source signal, an output processing stage for processing in parallel the at least one source signal with multiple parameters, each specific for one antenna of the multiple antennas, thus producing multiple antenna-specific output signals, and a plurality of output terminals, each of which being supplied with one of the multiple antenna-specific output signals, for supplying a plurality of radio frequency signal generators generating a plurality of simulated radio frequency signals, wherein the parameters include at least one of antenna characteristics and/or antenna location.

2. The device of claim 1, further comprising an input processing stage for converting data in the signal received from the at least one source signal terminal and distributing it to the output processing stage.

3. The device of claim 1, wherein the output processing stage comprises a plurality of parallel server units, one server unit per radio frequency signal generator or one server unit per several radio frequency signal generators.

4. The device of claim 1, wherein the simulated radio frequency signals are radar pulses and/or navigation signals.

5. The device of claim 1, wherein the at least one source signal terminal is configured to receive specific data from at least one database or databases, exemplarily for radar signals, wherein the at least one source signal terminal is especially configured to form the at least one source signal on the basis of the specific data.

6. The device of claim 1, wherein the at least one source signal terminal comprises information about which radio frequency signal generator has which abilities.

7. The device of claim 2, wherein the input processing stage is configured to perform at least one port agnostic calculation, especially at least one output terminal agnostic calculation.

8. The device of claim 7, wherein the at least one port agnostic calculation, especially the at least one output terminal agnostic calculation, comprises at least one of receiver properties, receiver movement, receiver velocity, doppler shift, signal attenuation, or any combination thereof.

9. A multiple antenna signal generation system, the system comprising a simulation device of claim 1 and a plurality of radio frequency signal generators connected to the output terminals of the simulating device, each radio frequency signal generator generating one or more output signals simulating antenna signals.

10. The system of claim 9, wherein an input stage, especially an input processing stage, of the simulating device distributes converted data to parallel server units of the output processing stage in a manner, exemplarily as to a bandwidth, taking into account characteristics of the radio frequency signal generator supplied by the respective server unit and/or the plurality of output terminals.

11. The system of claim 9, wherein the one or more output signals represent a respective realistic antenna output and/or input signal.

12. The system of claim 9, wherein each radio frequency signal generator is configured to simulate a hopping range up to a certain bandwidth.

13. The system of claim 9, wherein each radio frequency signal generator is configured with an interface to accommodate several base band units, especially several base band boards.

14. A method for simulating multiple antenna signals in parallel, the method comprising the steps of:

providing at least one source signal, converting the source signal, processing in parallel the at least one converted source signal with multiple parameters, each specific for one antenna of the multiple antennas, thus producing multiple antenna-specific output signals, and supplying the multiple antenna-specific output signals to a plurality of radio frequency signal generators generating a plurality of simulated radio frequency signals, wherein the parameters include at least one of antenna characteristics and/or antenna location.

* * * * *